Nov. 10, 1942.  R. F. HLAVATY  2,301,545

SELF-ALIGNING PULLEY

Original Filed Sept. 15, 1941

Inventor
Rudolph F. Hlavaty
by Parker & Carter
Attorneys.

Patented Nov. 10, 1942

2,301,545

UNITED STATES PATENT OFFICE 2,301,545

SELF-ALIGNING PULLEY

Rudolph F. Hlavaty, Cicero, Ill.

Original application September 15, 1941, Serial No. 410,871. Divided and this application January 26, 1942, Serial No. 428,272

14 Claims. (Cl. 74—241)

This invention relates to a self-aligning cylinder, wheel, roller, or other rotary member, either driving, driven, or idling. In one form it may be embodied in a pulley. It has for one object to provide a rotary member which has formed in it or adapted to it parts which cooperate automatically to keep it in alignment or to re-align it. Where the invention comprises a pulley operating with a belt, it serves to keep the belt and pulley aligned or to restore them to alignment.

It is well recognized that most belts and particularly wide or large belts have a tendency to move out of alignment. This tendency is particularly evident in the case of large rubber belts. Almost all belts are susceptible to change due to changing atmospheric and temperature conditions, and it is generally recognized that it is difficult to maintain such belts in alignment. In general practice, hand operated means are provided for re-aligning such belts, and frequent, if not constant, attention is required to maintain such belts properly aligned. It is one of the objects of this invention to obviate the necessity of any hand or manually controlled apparatus and to provide a belt pulley which is automatic and certain in its operation, and which automatically corrects and counteracts a tendency to misalignment.

Another object is to provide self-aligning means which act in response to side movement of the belt out of alignment; automatically to cause reverse side movement of the belt into the position of alignment.

Other objects will appear from time to time throughout the specification and claims.

This invention is illustrated more or less diagrammatically in the accompanying drawing, wherein.

Like parts are indicated by like characters throughout the specification and the drawing.

Figure 1:
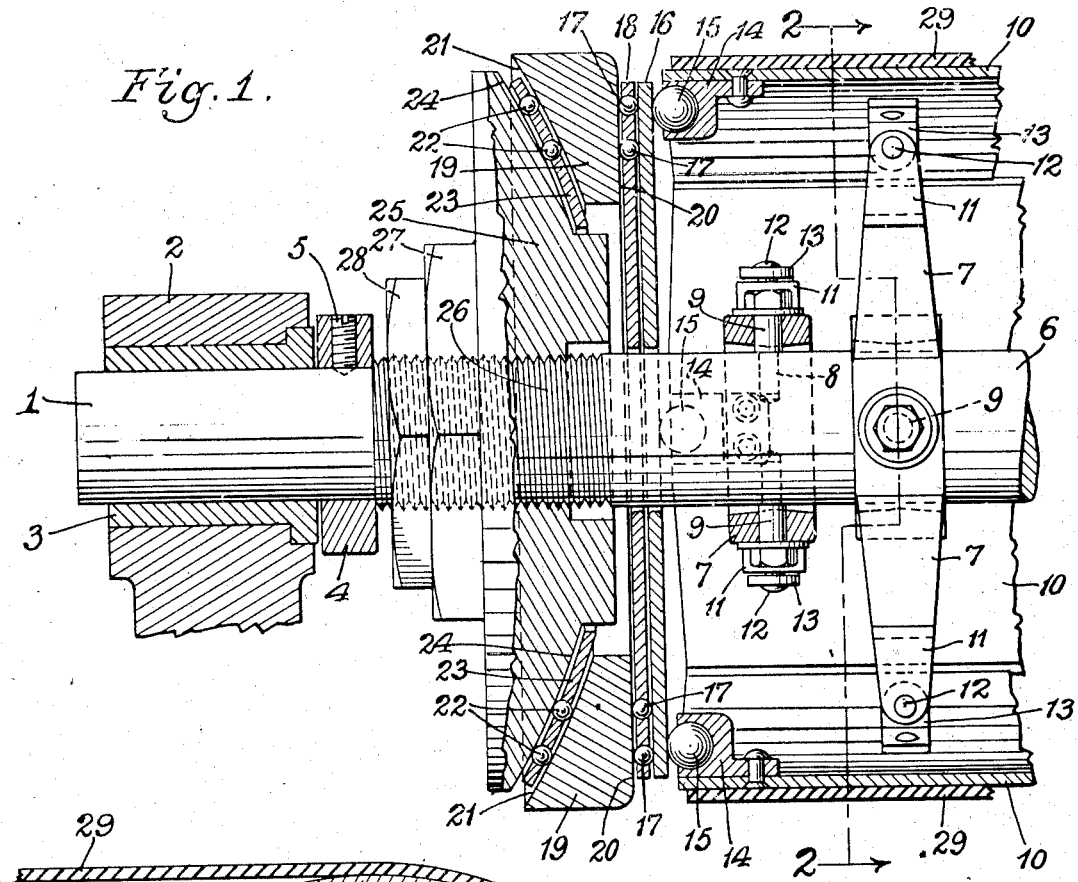
Figure 1 is a longitudinal section through one form of the device with parts broken away and parts omitted.
Figure 2:
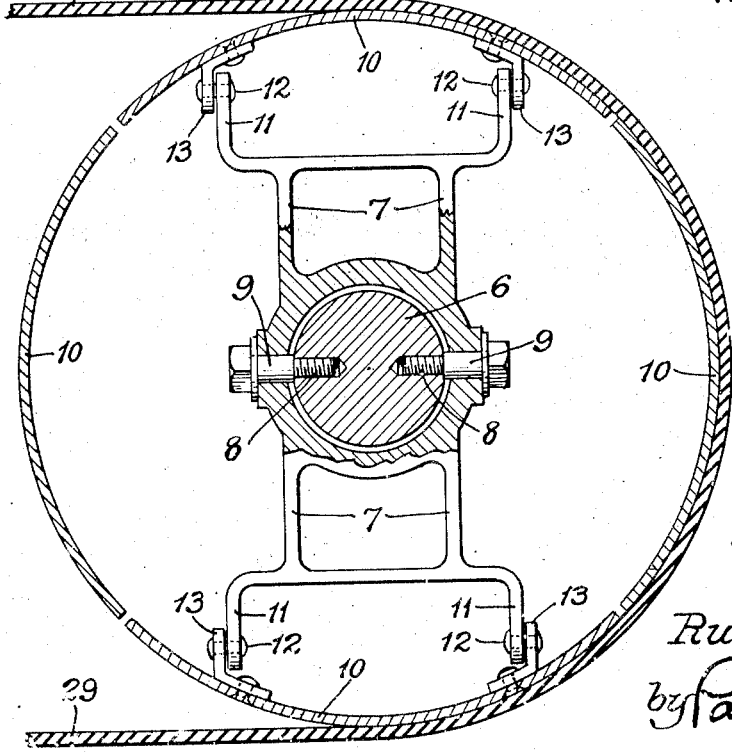
Figure 2 is a transverse section taken at line 2—2 of Figure 1.

In the form illustrated the self-aligning pulley includes a shaft-like member 1 which may be carried in bearings 2, which as shown in Figure 1 may be provided with bushings 3. A retaining ring 4 may be removably secured on the shaft by a set screw 5. The shaft 1 may be of any desired shape but as shown it is generally round, not only at its ends in the bushings 3 but centrally, as at 6.

Movably mounted on the shaft are two pairs of links 7. They are carried on screws 8 which are provided with bearing portions 9. These screws are fixed in the shaft portion 6 and provide bearings for the links 7. Each link is secured at each end to an arcuate pulley portion 10. In the particular form here shown there are four such arcuate pulley portions. Obviously there might be more, and if there were there would be more than four links. The links 7 are preferably bifurcated adjacent their ends, as at 11, and are rotatively secured by pins 12 to ears 13, which are themselves secured to a pulley surface portion 10.

At each end each of the surface members 10, preferably carries a ball supporting member 14, within which a ball 15 is mounted for rotation. These balls bear against a preferably flat surfaced ring or washer 16, which is free and loosely mounted on the shaft 1. Anti-friction balls 17 are mounted in a carrier or cage member 18. The balls are in contact with the member 16 and the carrier or cage 18 is loosely mounted upon shaft 1.

Member 19 is a ring or wedge member loosely mounted about the shaft 1 and having a flat face 20 against which the balls 17 roll. This member 19 also has a concave face 21. Balls 22 are in contact with this face and are supported in a carrier or cage member 23 which as shown particularly in Figure 1 is concave. The balls 22 are also in contact with the convex face 24 of a fixed member 25 which as shown is adjustably secured in place upon the threaded portion 26 of the shaft 1 and is held in place thereon in adjusted position by one or more nuts 27 or 28. Member 29 is a belt member. The pulley may be used with a belt of any design. The one shown is merely a disc belt, and may be made of any suitable material. The pulley may also be used without a belt. It is, of course, primarily intended for use in contact with some surface member or portion.

It will be realized that whereas I have described and shown a practical and operative embodiment of my invention and the method for carrying it out, nevertheless many changes may be made in the size, shape, number and disposition of parts and in the details and steps of such method without departing from the spirit of my invention. I therefore wish my description and drawing to be taken as in a broad sense illustrative or diagrammatic, rather than as limiting me to my precise showing.

In particular, of course many details can be varied. The bearing arrangement may be varied. The anti-friction bearing 17 and 22 might be omitted, together with their carriers or cages, and instead of the anti-friction bearings 15 other bearing members might be positioned at that point. The particular details of the levers 7 and their yoke portions 11 might be varied so long as oppositely placed surface members 10 are joined together in pairs by means which cause them to move in opposite directions when they are moved with respect to the supporting shaft portion 6. The details shown in these respects are merely illustrative of one suitable form and the invention is not limited in any respect to these details.

The use and operation of the invention are as follows:

Considering the pulley arrangement shown in the figures, it may be assumed that the belt is in proper alignment with respect to the pulley, as shown in Figure 1. If now the pulley is driven or if it rotates with respect to the belt or any other surface member, the danger of relative misalignment occurs, and this occurs whether or not the pulley is itself driven or acts merely as an idler. So far as the self-aligning features are concerned the operation is substantially the same in either case.

Assuming now that the pulleys are rotating and that the belt is moving, misalignment may occur. When that does, it will occur to the right or to the left, and if it is assumed that the belt moves to the left from the position of Figure 1, it will contact and may "climb up" on the left-hand wedge ring member 19. Because that ring fits loosely against the convex member 25, the weight or force of the belt will tend to depress that member, tilting it downwardly from the position shown in Figure 1. Due to the influence of the convex surface of the member 25 when the ring 19 moves downwardly along that surface, its upper edge moves to the right and exerts a pressure upon the uppermost pulley member 10. This pressure or thrust is directed to the right from the position shown in Figure 1, and thus the outer- or uppermost pulley member 10 is forced to the right. This thrust is transmitted through the levers 7 to the oppositely positioned pulley surface member 10, and forces that member to the left.

Since the construction at each end of the pulley is the same, the left-hand thrust is exerted on the lowermost pulley member 10 through another instrumentality. When the ring 19 at the left-hand end of the pulley is depressed because the belt 29 has climbed up on it and the uppermost surface member 10 is moved to the right in response to this movement, the corresponding ring 19 at the opposite end of the pulley is also moved to the right by the direct thrust of the uppermost member 10, and this causes the right-hand ring 19 to move upwardly along its corresponding convex member 25. As it moves upwardly it moves to the right, and its lower edge moves to the left, thus exerting a direct left-hand thrust on the lowermost member 10. Therefore, when one surface member 10 moves in one direction, its opposite surface member is caused to move in the opposite direction by different forces, one exerted through the levers 7 and the other exerted through the opposite wedge ring 19.

As a result of the movements of the surface members 10 above described, the misalignment of the belt to the left, for example, has caused two oppositely placed pulley members to shift axially along the shaft 6. As the uppermost member 10 is moved to the right, since it is the one against which the greatest load of the belt is pulling, it carries the belt body to the right, and thus tends to some degree, at least, to correct the misalignment. This effect is continued or may be continued as the pulley revolves, and should the belt move too far to the right, the same cycle of operations will occur but with the directions reversed so that the uppermost pulley member 10, should the belt move too far to the right, will be forced to the left and will guide the belt back. It will be seen that means are provided at each end of the pulley against which or upon which a misaligned belt can exert pressure and that pressure when exerted forces one or more of the relatively movable pulley surface members to move in the direction opposite to that in which misalignment has taken place.

This application is a division of my copending application Serial No. 410,871, filed September 15, 1941.

I claim:

1. In combination in a pulley adapted to engage a belt, a plurality of belt contacting members mounted for endwise movement along the pulley, and connecting levers extending between pairs of members, and movably joining them together, said levers comprising means for imparting endwise movement to a belt contacting member in one direction in response to endwise movement of the opposite member in an opposite direction.

2. In combination in a pulley adapted to engage a belt, a plurality of belt contacting members mounted for endwise movement along the pulley, there being an equal number of said members, and connecting levers extending between pairs of members, and movably joining them together, said levers comprising means for imparting endwise movement to a belt contacting member in one direction in response to endwise movement of the opposite member in an opposite direction.

3. In combination in a pulley adapted to engage a belt, a plurality of belt contacting members mounted for endwise movement along the pulley, there being an equal number of said members, and connecting levers extending between pairs of oppositely placed members, and movably joining them together, said levers comprising means for imparting endwise movement to a belt contacting member in one direction in response to endwise movement of the opposite member in an opposite direction.

4. In combination in a pulley adapted to engage a belt, a plurality of belt contacting members mounted for endwise movement along the pulley, there being an equal number of said members, and rigid connecting levers extending between pairs of oppositely placed members, and movably joining them together, said levers comprising means for imparting endwise movement to a belt contacting member in one direction in response to endwise movement of the opposite member in an opposite direction.

5. In combination in a pulley adapted to engage a belt, a plurality of belt contacting members mounted for endwise movement along the pulley, and connecting levers extending between pairs of members, and movably joining them together, said levers comprising means for imparting endwise movement to a belt contacting member in one direction in response to endwise movement of the opposite member in an opposite direction, and means for imparting endwise movement to a belt contacting member in response to belt misalignment.

6. In combination in a pulley adapted to contact a belt, a plurality of belt contacting surface members, a main support for said members, a plurality of levers supported on said main support, each lever engaging at its opposite end one of a pair of oppositely positioned surface members, wedge members fixed on said shaft one adjacent each end of said surface members, and movable members positioned to cooperate with said fixed wedge members and to effect a thrust against a surface member.

7. In combination in a pulley adapted to contact a belt, a plurality of belt contacting surface members, a main support for said members, a plurality of levers pivotally supported on said main support, each lever engaging at its opposite end one of a pair of oppositely positioned surface members, wedge members fixed on said shaft one adjacent each end of said surface members, and movable members positioned to cooperate with said fixed wedge members and to effect a thrust against a surface member.

8. In combination in a pulley adapted to contact a belt, a plurality of belt contacting surface members, a main support for said members, there being an equal number of said surface members, a plurality of levers supported on said main support, each lever engaging at its opposite end one of a pair of oppositely positioned surface members, wedge members fixed on said shaft one adjacent each end of said surface members, and movable members positioned to cooperate with said fixed wedge members and to effect a thrust against a surface member.

9. In combination in a pulley adapted to contact a belt, a plurality of belt contacting surface members, a main support for said members, there being an equal number of said surface members, a plurality of levers pivotally supported on said main support, each lever engaging at its opposite end one of a pair of oppositely positioned surface members, wedge members fixed on said shaft one adjacent each end of said surface members, and movable members positioned to cooperate with said fixed wedge members and to effect a thrust against a surface member.

10. In combination in a pulley adapted to contact a belt, a plurality of belt contacting surface members, a main support for said members comprising a shaft-like member, a plurality of levers supported on said main support, each lever engaging at its opposite end one of a pair of oppositely positioned surface members, wedge members fixed on said shaft one adjacent each end of said surface members, and movable members positioned to cooperate with said fixed wedge members and to effect a thrust against a surface member.

11. In combination in a pulley adapted to contact a belt, a plurality of belt contacting surface members, a main support for said members comprising a shaft-like member adapted to be supported for rotation, a plurality of levers supported on said main support, each lever engaging at its opposite end one of a pair of oppositely positioned surface members, wedge members fixed on said shaft one adjacent each end of said surface members, and movable members positioned to cooperate with said fixed wedge members and to effect a thrust against a surface member.

12. In combination in a pulley adapted to contact a belt, a plurality of belt contacting surface members, a main support for said members comprising a shaft-like member adapted to be supported in bearings for rotation, there being an equal number of said surface members, a plurality of levers supported on said main support, each lever engaging at its opposite end one of a pair of oppositely positioned surface members, wedge members fixed on said shaft one adjacent each end of said surface members, and movable members positioned to cooperate with said fixed wedge members and to effect a thrust against a surface member.

13. In combination in a pulley adapted to contact a belt, a plurality of belt contacting surface members, a main support for said members comprising a shaft-like member adapted to be supported in bearings for rotation, there being an equal number of said surface members, a plurality of levers pivotally supported on said main support, each lever engaging at its opposite end one of a pair of oppositely positioned surface members, wedge members fixed on said shaft one adjacent each end of said surface members, and movable members positioned to cooperate with said fixed wedge members and to effect a thrust against a surface member.

14. In combination in a pulley adapted to contact a belt, a plurality of belt contacting surface members, a main support for said members comprising a shaft-like member adapted to be supported in bearings for rotation, there being an equal number of said surface members, a plurality of levers pivotally supported on said main support, each lever engaging at its opposite end one of a pair of oppositely positioned surface members, wedge members fixed on said shaft one adjacent each end of said surface members, and movable wedge members positioned to cooperate with said fixed wedge members and to effect a thrust against a surface member.

RUDOLPH F. HLAVATY.